US006492614B2

United States Patent
Murdza et al.

(10) Patent No.: US 6,492,614 B2
(45) Date of Patent: Dec. 10, 2002

(54) SYSTEM AND PROCESS FOR MAGNETIC FIXTURING OF OPTICAL COMPONENTS ON BENCH FOR SOLDER ATTACH

(75) Inventors: Randal A. Murdza, North Andover; Walid A. Atia, Lexington, both of MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/769,565

(22) Filed: Jan. 25, 2001

(65) Prior Publication Data

US 2002/0096498 A1 Jul. 25, 2002

(51) Int. Cl.⁷ .............................. B23K 26/20; G02B 6/42
(52) U.S. Cl. ........................... 219/121.64; 219/121.63; 359/819; 385/92; 385/136
(58) Field of Search ................. 219/121.63, 121.64; 385/92, 93, 136, 137; 359/819

(56) References Cited

U.S. PATENT DOCUMENTS

| | | | |
|---|---|---|---|
| 2,953,970 A | 9/1960 | Maynard | 88/113 |
| 2,959,832 A | 11/1960 | Baermann | 24/201 |
| 3,758,217 A | 9/1973 | Stokstad | 356/256 |
| 4,422,652 A | 12/1983 | Shapiro et al. | 279/1 |
| 4,854,667 A * | 8/1989 | Ebata et al. | |
| 5,786,936 A | 7/1998 | Baumann et al. | 359/557 |
| 5,793,540 A * | 8/1998 | Ohtsuki et al. | 359/819 |
| 6,061,190 A | 5/2000 | Kane et al. | 359/811 |

FOREIGN PATENT DOCUMENTS

| | | | | |
|---|---|---|---|---|
| JP | 61250603 | | 7/1986 | G02B/6/00 |
| JP | 61-250603 A | * | 11/1986 | 385/136 |
| JP | 63064012 | | 3/1988 | G02B/7/00 |
| JP | 1-310314 A | * | 12/1989 | 385/137 |
| JP | 1-310315 A | * | 12/1989 | 385/137 |
| JP | 9-152526 A | * | 6/1997 | |

* cited by examiner

Primary Examiner—Geoffrey S. Evans
(74) Attorney, Agent, or Firm—Grant Houston

(57) ABSTRACT

A magnetically-assisted fixturing process for optical components on a bench utilizes precision placement of an optical component on a bench. This placement can be done either entirely passively, actively, or using a combination of active and passive alignment. The optical component is then held on the bench using a magnetic field. Thus, the optical component is maintained in a stable relationship with respect to the bench, especially after it has been aligned. The optical component is then affixed to the bench, typically by a solder bonding process. Alternatively, other bonding processes can be used, such as epoxy bonding or laser welding. In one implementation, the magnetic fixturing is maintained during the process of affixing or bonding the optical component. Thus, in one example, the optical bench can be transported to a solder reflow oven while the optical component is held on the bench via the magnetic fixturing.

38 Claims, 3 Drawing Sheets

SYSTEM AND PROCESS FOR MAGNETIC FIXTURING OF OPTICAL COMPONENTS ON BENCH FOR SOLDER ATTACH

BACKGROUND OF THE INVENTION

Component alignment is of critical importance in microoptical systems and especially semiconductor and/or MOEMS (microoptical electromechanical systems) optical system manufacturing. The basic nature of light requires that light generating, transmitting, and modifying components must be positioned accurately with respect to one another, especially in the context of free-space-interconnect optical systems, in order to function properly and effectively. Scales characteristic of optical semiconductor and MOEMS technologies can necessitate micron to sub-micron alignment accuracy.

Consider the specific example of coupling light from a semiconductor diode laser, such as a pump or transmitter laser, to single mode fiber. Only the power that is coupled into the fiber core is usable, and the coupling efficiency is highly dependent on accurate alignment between the laser output facet and the core; inaccurate alignment can result in partial or complete loss of signal transmission through the optical system. Moreover, if polarization-maintaining fiber is used, there is an added need to rotationally align the fiber relative to the laser to maintain the single polarization characteristic of the output signal.

Other more general examples include optical amplification, receiving and/or processing systems. Some alignment is typically required between an optical signal source, such as the fiber endface, and a defector. In more complex systems including tunable filters, for example, alignment is required not only to preserve signal power, dynamic range, but also to yield high quality systems through the suppression of undesirable optical modes within and without the systems.

In the example of a tunable filter system, light, typically supplied by fiber, is injected into an optical train, which includes a tunable filter, such as Fabry-Perot (FP) tunable filter. The launch characteristics of the light into the FP filter cavity determine the side mode suppression ratio (SMSR) of the system. This ratio, in part, dictates the quality of the system. If light is launched into the filter at the wrong position or with the wrong spot size, higher order modes are excited in the filter, degrading the system's SMSR. Typically, filter train alignment is employed to extract the highest possible SMSR.

Generally, there are two types of alignment strategies: active and passive. Passive alignment relies on the precision placement of the optical components relative to some physical reference. For example, registration or alignment features can be fabricated directly on the optical components, such as the optical elements or element mounting structures, as well as on the platform to which the components are to be mounted. The components are then mounted and bonded directly to the platform using the alignment features. Other techniques rely on vision and/or metrology systems. Contrastingly, in active alignment, an optical signal is transmitted through the components and detected. The alignment is performed based on the transmission characteristics to enable the highest possible performance level for the system.

In the context of commercial volume manufacturing, selection between active and passive alignment, or some mix of the two, is determined based on the quality of part needed. Lower cost, lower performance devices are typically manufactured with entirely passive alignment strategies, whereas the manufacture of high performance devices typically involves at least some active alignment.

SUMMARY OF THE INVENTION

In the manufacture of optical systems, it is typically possible to passively align two optical components, such as components including lenses. In micro-optical trains, where beam diameters can be less than one millimeter and are usually less than 500 micrometers, alignment accuracies of 10 micrometers are possible by utilizing jigs, optical component templates and/or registration/alignment feature systems.

In other situations, such as carrier-class systems and/or systems that have tunable optical filters, alignment tolerances of better than 5 micrometers are common. Moreover, in some implementations, submicrometer alignment tolerances are required, and even sub-100 nanometer tolerances can be required to achieve high side mode suppression ratios, for example, in tunable filter systems or when maximizing coupling efficiency in high power laser systems. In such optical systems, the alignment tolerances are more rigorous than that obtainable with conventional passive alignment techniques. As a result, active alignment is required.

In either case, whether active or passive alignment or a combination of active and passive alignment is used with the result being that the optical component has been placed or otherwise located, the component must be affixed to its carrier, typically called a submount or optical bench. While an adhesive such as epoxy can be used, solder bonding or laser welding is typically the preferred modality of affixing the component, because of advantages associated with a well-understood behavior such as long-term stability over wide temperature ranges.

The bonding process can require the physical movement of the bench with the placed optical component and/or removal from placement/alignment systems. For example, the best solder bonds are typically achieved in solder reflow ovens, which provide a well-controlled reflow environment. Laser welding devices must have a clear path to the areas of the optical component where the welds are to be produced. This requirement can create contention with the placement strategy used.

The present invention is directed to a magnetically-assisted fixturing process for optical components on a bench. Basically, the process and associated system alignment station utilize precision placement of an optical component on a bench. This placement can be done either entirely passively, actively, or using a combination of active and passive alignment. The optical component is then held on the bench using a magnetic field. Thus, the optical component is maintained in a stable relationship with respect to the bench, especially after it has been aligned. The optical component is then affixed to the bench, typically by a solder bonding process. Alternatively, other bonding processes can be used, such as epoxy bonding or laser welding. In one implementation, the magnetic fixturing is maintained during the process of affixing or bonding the optical component. Thus, in one example, the optical bench can be transported to a solder reflow oven while the optical component is held on the bench via the magnetic fixturing.

Moreover, in some implementations, the magnetic field is maintained during the solder reflow process. This can restrict both lateral movement of the component, while the solder is molten, and also yield a final solder layer between that component and the bench that has a uniform thickness from component-to-component. This can be an important advantage of the system since it yields a uniform y-axis, i.e., orthogonal to the plane of the optical bench, optical axis height.

In general, according to one aspect, the invention features a magnetically-assisted fixturing process for optical components to a bench. The process comprises placing at least one optical component on the bench, and then holding the optical component on the bench with a magnetic field. The optical component is then affixed to the bench.

In one implementation, the bench is constructed from a non-magnetic material. The optical component, however, comprises ferromagnetic material. The magnetic field is oriented to pull the optical component against the bench.

In the current implementation, the optical component comprises an optical element, such as a lens or tunable or fixed filter. A mounting structure is used to support this optical element on and above the optical bench. The mounting structures are made from nickel or an alloy including nickel in current implementations.

Depending on the implementation, permanent magnets or electromagnets are used to generate the magnetic field. Electromagnets have an advantage in that their electric field can be modulated without removing the magnet structure. Thus, the strength of the magnetic field can be temporarily reduced while optical component is placed or during replacement of the optical component in which its alignment is improved.

In one embodiment, an active alignment process is used for the optical component. Specifically, an optical signal is generated that interacts with the optical component. For example, the optical signal may be transmitted through the optical component or reflected by the optical component. The optical signal is then subsequently detected. The optical component is then positioned relative to the optical system in response to the detected optical signal.

In any case, once the optical component is placed, its position is preferably confirmed. If the alignment is inadequate, a repositioning or realignment step can be performed. According to the preferred embodiment, once the optical component has been placed, the optical bench is removed from the alignment station and installed in an SRO for solder reflow. If permanent magnets are used, they can be easily kept with the bench during the solder reflow process to maintain the positioning of the optical component. Alternatively, the magnetic field is removed during the reflow process.

Alternatively or in addition to: active alignment, passive alignment techniques are preferably employed to at least initially locate the optical component on the bench. For example, bench registration features such as raised bench features can be used and the optical component abutted against these features. Alternatively, marks on the bench can be used for the optical component placing process.

In general, according to another aspect, the invention also features an optical system alignment station. The station comprises an optical system chuck that secures the optical system. An optical component alignment system supports an optical component in proximity to or on the optical system bench and enables orientation of the optical component relative to the bench. A magnetic field generator then generates a magnetic field that pulls the optical component into engagement with the bench.

In one embodiment, an active alignment system is used. Specific an alignment signal generator generates an optical signal that interacts with the optical component. An optical signal detector then detects the alignment signal after interaction with the optical component. The optical component alignment system then positions the optical component in response to the alignment signal detector. Depending on the configuration of the optical signal, the optical signal generator can be a laser system that is part of the optical system. Alternatively, the alignment signal generator can be a separate system that generates an optical signal that is used during the alignment process. Further, the alignment signal detector can be part of the optical system or a separate detector that is inserted into the optical signal only for the alignment process.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
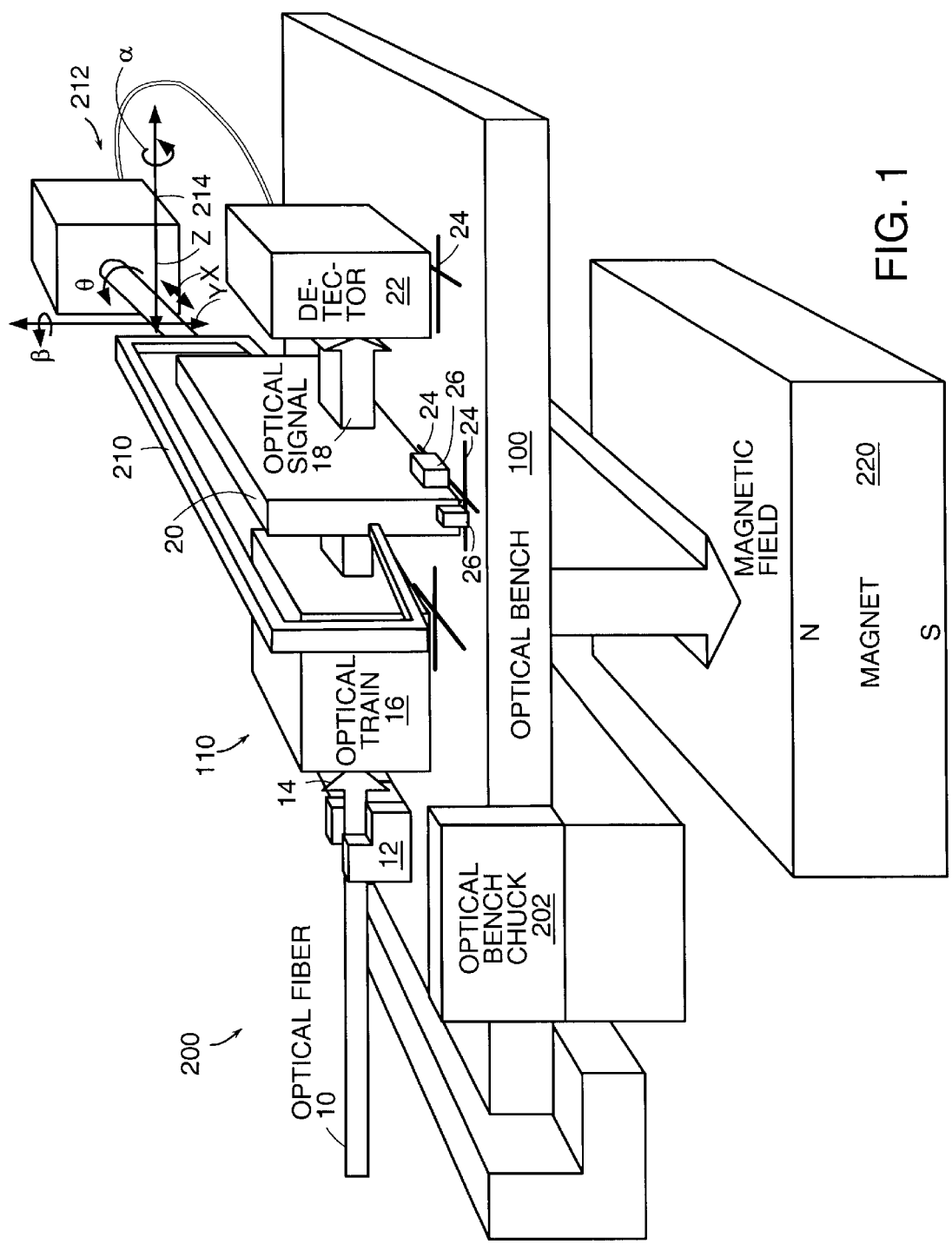
FIG. 1 is a perspective schematic view of an optical system and the optical system alignment station of the present invention.

FIG. 1 illustrates an optical system 110 being assembled using an optical system alignment station 200, which has been constructed according to the principles of the present invention.

The optical system 110, in the illustrated example, generally comprises an optical bench 100 and various optical components of an optical train. Specifically, in the illustrated example, an optical fiber 10 is secured to the optical bench 100 via a mounting structure 12. It holds the fiber endface 14 in a stable relationship with the optical bench 100, and thus the optical system.

The optical signal from the optical fiber is received by optical train 16. Depending on the implementation, this optical train 16 comprises single or multiple lenses, filters, and/or other optical elements such as fixed/WDM dichroic filters and beam combiners. Optical signal 18 is emitted from this optical train to interact with an optical component 20. In the illustrated example, the optical signal 18 is transmitted through the optical component 20.

After transmission through the optical component 20, the optical signal 18 is detected by a detector 22. Each of the fiber mounting structure 12, optical train 16, and detector 22 is secured to the bench 100. In some examples, these components are secured to the bench 100 using alignment features. For example, bench alignment marks 24 can be used in the placement operation, which includes a pick-and-place machine in one example. Alternatively, registration features 26 are used in other embodiments or in addition to the bench alignment marks 24.

The inventive optical system alignment station 200 comprises an optical component engagement arm 210. This engages the optical component 20 that is being aligned to the optical system 110. The optical component engagement arm 210 is part of an optical component alignment system 212 that further comprises an actuator 214. In the preferred embodiment, the actuator/controller 214 manipulates the position of the optical component 20 with six degrees of freedom, three displacement and three rotation. Specifically, the actuator 214 positions the optical component 20 1) in a direction that is orthogonal to the plane of the optical bench 100, the y-axis direction, 2) in a direction that is orthogonal to the optical axis of the optical system defined by the optical signal 18 and parallel to the plane of bench 100, the x-axis direction, 3) in a direction that is parallel to the optical axis or the z-axis direction, 4) rotation about the x-axis, the θ direction, 5) rotation about the y-axis, the β direction, and finally 6) rotation about the z-axis or α direction.

An optical bench chuck 202 is used to secure the optical system 110 and specifically the optical bench 100 in a stable relationship with the optical component alignment system.

A magnet 220 is further provided that has a stable relationship with the optical bench chuck 202 and the optical component alignment system. This magnet generates a magnetic field that is orthogonal or largely orthogonal to the plane of the optical bench. Since the optical component 20 comprises ferromagnetic material, the magnetic field from the magnet 220 functions to pull the optical component 20 into engagement with the bench 100.

In an alternative embodiment, a blind hole is formed in a permanent magnet. The hole is sized to the bench 100. The bench is placed in the blind hole and then the optical component installed on the bench manually, in one example.

Figure 2:
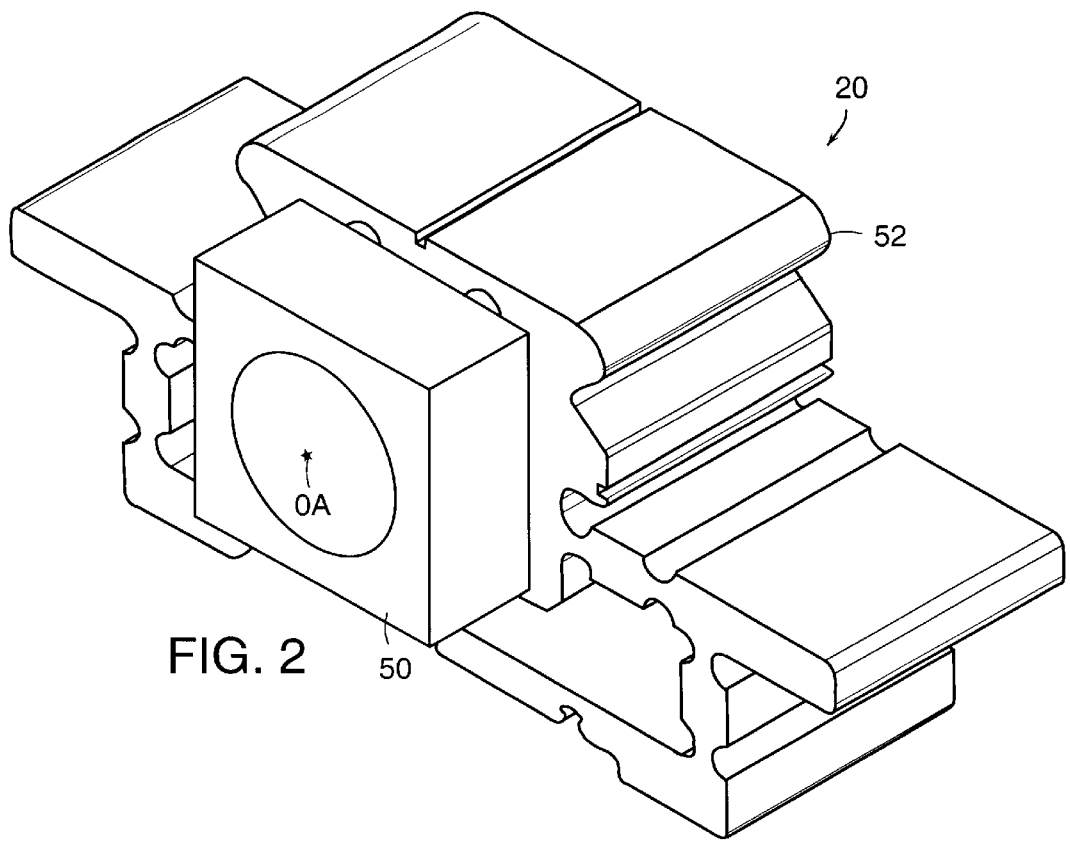
FIG. 2 is a perspective view of an exemplary optical component comprising a lens-type optical element on a mounting structure.

FIG. 2 shows one example of an assembled optical component 20. An optical element 50, such as a concave or convex lens, is installed onto a mounting structure 52. In a current implementation, the lens is manufactured from silicon or gallium phosphide using a mass transport process. The mounting structure is manufactured from a ferromagnetic substance such as nickel or a nickel alloy. Presently, the mounting structures 52 are manufactured using the LIGA process. LIGA is a German acronym that stands for lithography, plating, and molding.

Figure 3:
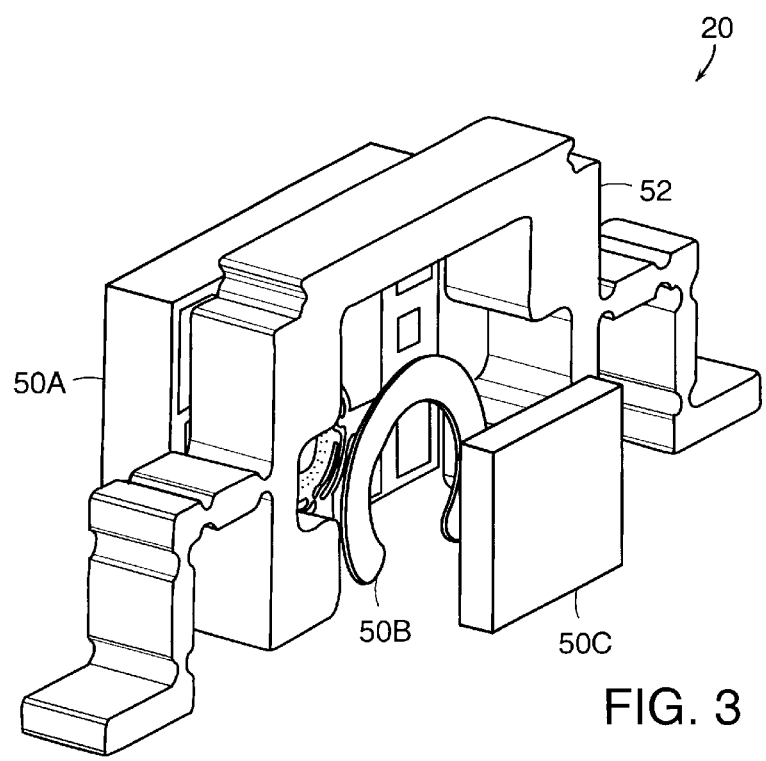
FIG. 3 is an exploded view of a tunable filter optical component in which a tunable filter optical element is installed on a filter mounting structure.

FIG. 3 illustrates an exemplary tunable filter optical component 20. Specifically, a micro-optical electromechanical system (MOEMS) optical membrane substrate 50A is combined with a concave reflecting lens 50C using an intervening spacer layer 50B. This assembled filter optical element is then installed on a ferromagnetic filter mounting structure 52.

Figure 4:
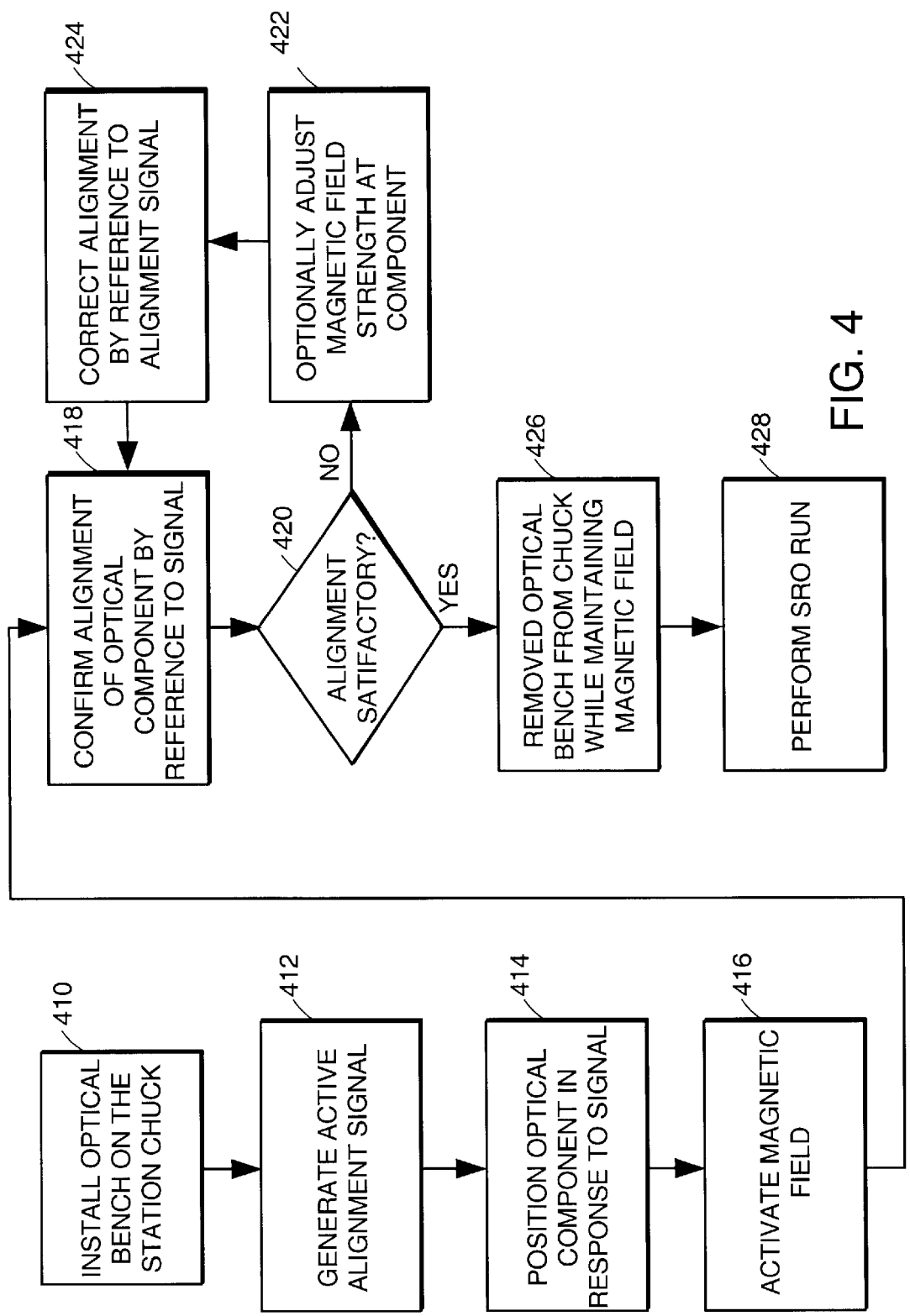
FIG. 4 is a flow diagram illustrating the magnetically-assisted fixturing process for optical components, according to the present invention.

FIG. 4 illustrates the magnetically-assisted fixturing process for optical components on benches according to the present invention. Specifically, in step 410, the optical bench is installed on the station chuck 202. Typically, the chuck comprises a clamping mechanism so that the optical bench 100 is held firmly in the chuck 202. Alternatively, the bench 100 can simply be installed on a permanent magnet as described above.

Next, in step 412, the active alignment signal is generated. In the illustrated example, the active alignment signal is carried to the bench through an optical fiber 10. This optical signal 18 interacts with the optical train 16 and then the optical component 20, which is to be aligned. After interaction, such as transmission through optical component 20 or reflection by optical component 20, the alignment signal is detected. Note, initially, the optical component 20 can be installed on the optical bench using passive alignment such as by reference to bench alignment marks 24 or registration features 26.

Then, in step 414, the optical component 20 is positioned by the optical component alignment system 212 in response to the optical signal 18. Specifically, in one implementation, the optical component alignment system 212 positions the optical component 20 to maximize the amount of optical signal 18 detected by the detector. Alternatively, an entirely passive placement of the component is employed.

In the preferred embodiment, once the optical component has been aligned relative to the optical train, for example, the magnetic field from the magnetic field source 220 is activated in step 416. In one implementation, where the magnet 220 is an electromagnet, the magnetic field is activated by simply energizing the electromagnet. In an alternative embodiment, the magnetic field is activated by bringing a permanent magnet 220 near the optical bench 100.

In still another embodiment, the alignment system 212 positions the optical component 20 while the magnetic field is present. Positioning the optical component 20 in a magnetic field can impact the accuracy of the alignment system 212 if it has insufficient force to counteract the field's effect on the ferromagnetic material of the optical component 20.

Once the field has been activated and the optical component has been positioned, the alignment of the optical component is confirmed in step 418. This is accomplished sometimes by metrology analysis of the position of the optical component 20. Alternatively, in the active alignment implementation, the alignment is determined to be satisfactory by detecting the level of the optical signal 18 or signal SMSR using the detector 22 and comparing it to a threshold determining acceptability.

If alignment is determined to be unsatisfactory in step 420, it is possible to optionally adjust the magnetic field strength in step 422. This typically includes reducing the magnetic field strength at the optical component 20. The alignment is then corrected in step 424, possibly by reference to the alignment signal or alternatively using metrology. This process repeats until adequate alignment is detected in step 420.

In the typical implementation, once alignment is satisfactory, the optical bench 100 is removed from the optical bench chuck 202. The magnetic field, however, is preferably maintained by retaining the magnetic source 220 in proximity to the optical bench. For example, in one implementation, a permanent magnet is maintained underneath the optical bench 100.

Then, the optical component 20 is permanently affixed to the optical bench 100. In the preferred embodiment, this occurs through a solder reflow process. Specifically, the optical bench and preferably with the magnet still maintaining the position of the optical component is placed in a solder reflow oven where a solder layer between the optical component 20 and the optical bench 100 is reflowed. The solder layer can be predeposited on either the bench 100 or the optical component 20, or both. Alternatively, it can be installed between the optical bench and the optical component 20 in the form of solder preform.

Preferably, the magnetic field is maintained until the solder resolidifies to promote consistent y-axis height of the optical component 20.

Alternatively, other bonding strategies can be employed such as epoxy bonding and laser welding.

While this invention has been particularly shown and described with references to preferred embodiments thereof, it will be understood by those skilled in the art that various changes in form and details may be made therein without departing from the scope of the invention encompassed by the appended claims.

What is claimed is:

1. A magnetically-assisted fixturing process for optical components on benches, the process comprising:
    placing at least one optical component on a bench;
    holding the at least one optical component on the bench with a magnetic field during a transfer of the bench to a machine for performing affixing; and
    then affixing the optical component to the bench with the machine.

2. A process as claimed in claim 1, wherein the bench is made from a non-magnetic material.

3. A process as claimed in claim 1, wherein the at least one optical component comprises a ferromagnetic material, and the step of magnetically holding the at least one optical component comprises generating a magnetic field that is oriented to pull the at least one optical component against the bench.

4. A process as claimed in claim 1, wherein the at least one optical component comprises a mounting structure, comprising a ferromagnetic material, and an optical element, and the step of magnetically holding the at least one optical component comprises generating a magnetic field that is oriented to pull the mounting structure against the bench.

5. A process as claimed in claim 4, wherein the mounting structure comprises nickel.

6. A process as claimed in claim 1, wherein the step of magnetically holding the at least one optical component on the bench comprises generating a magnetic field to pull the at least one optical component against the bench using a permanent magnet.

7. A process as claimed in claim 1, wherein the step of magnetically holding the at least one optical component on the bench comprises generating a magnetic field to pull the at least one optical component against the bench using an electromagnet.

8. A process as claimed in claim 1, further comprising aligning the at least one optical component on the bench after the step of placing the at least one optical component on the bench.

9. A process as claimed in claim 8, wherein the step of aligning the at least one optical component comprises detecting an optical signal after transmission through the at least one optical component and manipulating the at least one optical component in response to the optical signal.

10. A process as claimed in claim 8, wherein the step of aligning the at least one optical component comprises detecting an optical signal after interaction with the at least one optical component and manipulating the at least one optical component in response to the optical signal.

11. A process as claimed in claim 1, wherein the step of affixing comprises laser welding the at least one optical component to the optical bench.

12. A process as claimed in claim 1, wherein the step of magnetically holding the at least one optical component is at least partially contemporaneous with the step of permanently affixing the at least one optical component to the bench.

13. A process as claimed in claim 1, wherein the machine affixing the at least one optical component to the bench is a solder reflow oven.

14. A process as claimed in claim 1, wherein the step of placing the at least one optical component on the bench comprises placing the at least one optical component on the bench to an accuracy of better than 5 micrometers.

15. A process as claimed in claim 1, wherein the step of placing the at least one optical component on the bench comprises placing the at least one optical component on the bench with reference to alignment features on the bench.

16. A process as claimed in claim 1, wherein the step of placing the at least one optical component on a bench comprises placing the at least one optical component on the bench by abutting the at least one optical component against registration features.

17. A process as claimed in claim 16, wherein the registration features are formed on the bench.

18. A process as claimed in claim 1, wherein the step of affixing the at least one optical component to the bench comprises solder bonding the at least one optical component to the bench.

19. A process as claimed in claim 18, further comprising pre-depositing solder on the bench prior to the affixing step.

20. A process as claimed in claim 18, further comprising inserting a solder perform between the bench and the at least one optical component prior to the affixing step.

21. A process as claimed in claim 1, wherein the step of affixing the at least one optical component to the bench comprises welding the at least one optical component to the bench.

22. A process as claimed in claim 1, wherein the step of affixing the at least one optical component to the bench comprises epoxy bonding the at least one optical components to the bench.

23. A process as claimed in claim 1, wherein the step of affixing the at least one optical component to the bench comprises heating the bench and the at least one optical component in a solder reflow oven to reflow solder between the at least one optical component and the bench.

24. A magnetically-assisted fixturing process for optical components on benches, the process comprising:
    placing at least one optical component on a bench;
    holding the at least one optical component on the bench with a magnetic field;
    aligning the at least one optical component on the bench after the step of placing the optical component on the bench by temporarily reducing a strength of the magnetic field at the at least one optical component during repositioning of the at least one optical component; and
    then affixing the at least one optical component to the bench.

25. An optical system alignment station comprising:
    an optical system chuck that secures the optical system;
    an optical component alignment system that supports an optical component in proximity to or on a bench of the optical system and enables orientation of the optical component relative to the bench;
    an affixing system that affixes the optical component to the bench; and
    a magnetic field generator that generates a magnetic field that pulls the optical component into engagement with the bench at the optical component alignment system and at the affixing system and transfer therebetween.

26. An optical system alignment station as claimed in claim 25, further comprising:

an alignment signal generator that generates an optical signal that interacts with the optical component; and an alignment signal detector that detects the alignment signal after interaction with the optical component.

27. An optical system alignment station as claimed in claim 26, wherein the optical component alignment system positions the optical component in response to the alignment signal detector.

28. An optical system alignment station as claimed in claim 26, wherein the optical component alignment system positions the optical component to maximize a response of the alignment signal detector to the optical signal.

29. An optical system alignment station as claimed in claim 26, wherein the alignment signal generator is a laser system that is part of the optical system.

30. An optical system alignment station as claimed in claim 26, wherein the alignment signal detector is part of the optical system.

31. An optical system alignment station as claimed in claim 26, wherein an optical signal is generated that interacts with the optical system of the bench and the optical component and is then detected to thereby enable determination of alignment of the optical component relative to the optical system of the bench.

32. An optical system alignment station as claimed in claim 25, wherein the optical system chuck engages the optical bench.

33. An optical system alignment station as claimed in claim 25, wherein the affixing system comprises a solder reflow oven for reflowing solder between the optical component and the optical bench after placement of the optical component by the optical component alignment system.

34. An optical system alignment station as claimed in claim 25, wherein the affixing system comprises a laser welder for attaching the optical component to the optical bench.

35. An optical system alignment station comprising:

an optical system chuck that secures the optical system;

an optical component alignment system that supports an optical component in proximity to, or on a bench of the optical system and enables orientation of the optical component relative to the bench;

a magnetic field generator that generates a magnetic field that pulls the optical component into engagement with the bench; and a solder reflow oven for reflowing solder between the optical component and the optical bench after placement of the optical component by the optical component alignment system, wherein the magnetic field generator is capable of being detached from the optical component alignment system with the optical bench to follow the bench to the solder reflow oven.

36. An optical system alignment station as claimed in claim 35, wherein the magnetic field generator comprises a permanent magnet.

37. An optical system alignment station as claimed in claim 35, wherein the magnetic field generator comprises an electromagnet.

38. An optical system alignment station as claimed in claim 35, wherein the bench is installed in the solder reflow oven with the magnetic field generator.

* * * * *